US012658358B2

(12) United States Patent
Takahashi et al.

(10) Patent No.: US 12,658,358 B2
(45) Date of Patent: Jun. 16, 2026

(54) INDUCTOR COMPONENT

(71) Applicant: Murata Manufacturing Co., Ltd., Kyoto-fu (JP)

(72) Inventors: Daisuke Takahashi, Nagaokakyo (JP); Kenichi Tani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 954 days.

(21) Appl. No.: 17/929,896

(22) Filed: Sep. 6, 2022

(65) Prior Publication Data

US 2023/0074711 A1 Mar. 9, 2023

(30) Foreign Application Priority Data

Sep. 9, 2021 (JP) ................................. 2021-147027

(51) Int. Cl.
*H01F 27/29* (2006.01)
*H01F 5/00* (2006.01)

(52) U.S. Cl.
CPC ........... *H01F 27/292* (2013.01); *H01F 5/003* (2013.01)

(58) Field of Classification Search
CPC ............................... H01F 27/292; H01F 5/003
USPC .................................................. 336/195, 200
See application file for complete search history.

(56) References Cited

U.S. PATENT DOCUMENTS 11,133,126 B2 * 9/2021 Jang .................... H01F 17/0013
11,170,930 B2 * 11/2021 Shimoda ................. H01F 27/30
11,763,982 B2 * 9/2023 Lee ......................... H01F 41/12 336/221
11,791,086 B2 * 10/2023 Yatabe ................... H01G 4/012 336/200
12,494,316 B2 * 12/2025 Chiu ................... H01F 17/0013
2008/0257488 A1 * 10/2008 Yamano ................ H01F 41/122 156/274.2
2015/0137929 A1 * 5/2015 Park .................... H01F 17/0013 336/200
2017/0018351 A1 * 1/2017 Yatabe ................ H01F 27/2804
2018/0096769 A1 * 4/2018 Sekiguchi ............... H01F 41/04

(Continued)

FOREIGN PATENT DOCUMENTS

CN 109390138 A 2/2019
JP 2012-79870 A 4/2012

(Continued)

*Primary Examiner* — Shawki S Ismail
*Assistant Examiner* — Joselito S. Baisa
(74) *Attorney, Agent, or Firm* — Studebaker Brackett PLLC

(57) ABSTRACT

An inductor component includes a rectangular parallelepiped shaped element body and an inductor wiring extending inside the element body. The body has a first electrode exposed to outside the body in a region from a bottom surface to a first end surface. The inductor wiring includes a first wiring portion extending parallel to a first main surface from a first end and a via extending perpendicular to the first main surface from the first wiring portion. In a direction perpendicular to the first main surface, a first wiring layer is a layer having the first wiring portion and a first via layer is a layer having the via. A first wiring layer height, which is the maximum height of the first electrode in the first wiring layer, is larger than a first via layer height, which is the maximum height of the first electrode in the first via layer.

20 Claims, 5 Drawing Sheets

(56) References Cited

U.S. PATENT DOCUMENTS

| | | | | |
|---|---|---|---|---|
| 2018/0122555 | A1* | 5/2018 | Kim | H01F 27/292 |
| 2018/0286561 | A1* | 10/2018 | Shimoichi | H01F 27/28 |
| 2018/0351526 | A1* | 12/2018 | Miyoshi | H01F 27/29 |

FOREIGN PATENT DOCUMENTS

| | | | |
|---|---|---|---|
| JP | 2019-036589 | A | 3/2019 |
| JP | 2019-062182 | A | 4/2019 |
| JP | 2021-019093 | A | 2/2021 |
| JP | 2021-022663 | A | 2/2021 |
| KR | 10-2017-0032057 | A | 3/2017 |

* cited by examiner

INDUCTOR COMPONENT

CROSS-REFERENCE TO RELATED APPLICATION

This application claims benefit of priority to Japanese Patent Application No. 2021-147027 filed Sep. 9, 2021, the entire content of which is incorporated herein by reference.

BACKGROUND

Technical Field

The present disclosure relates to an inductor component.

Background Art

An inductor component disclosed in Japanese Unexamined Patent Application Publication No. 2012-79870 includes a rectangular parallelepiped shaped element body having six outer surfaces. The six outer surfaces of the element body consist of a first main surface, which is a surface having the largest area, a second main surface that is parallel to the first main surface, a first end surface that is perpendicular to the first main surface, a second end surface that is parallel to the first end surface, a bottom surface that is perpendicular to the first main surface and the first end surface, and a top surface that is parallel to a first side surface. In addition, the inductor component includes an inductor wiring. The inductor wiring is located inside the element body. The element body has a first electrode and a second electrode. A first end of the inductor wiring is connected to the first electrode. In addition, a second end of the inductor wiring is connected to the second electrode. The first electrode is exposed to outside the element body in a region spanning from the first end surface to the bottom surface.

In the inductor component disclosed in Japanese Unexamined Patent Application Publication No. 2012-79870, the area where the first electrode is exposed to outside the element body is preferably small from the viewpoint of reducing a stray capacitance generated between the first electrode and the inductor wiring. On the other hand, when the area where the first electrode is exposed to outside the element body is small, the posture of the inductor component may be unstable when the inductor component is mounted on a substrate and therefore the inductor component may be mounted in a tilted state.

SUMMARY

Accordingly, an embodiment of the present disclosure provides an inductor component. The inductor component includes a rectangular parallelepiped shaped element body having six outer surfaces and an inductor wiring that extends inside the element body. The element body has a first electrode connected to a first end of the inductor wiring and a second electrode connected to a second end of the inductor wiring. When, among the six outer surfaces of the element body, one particular surface is a main surface, one surface that is perpendicular to the main surface is a first end surface, a surface that is parallel to the first end surface is a second end surface, and one surface that is perpendicular to both the main surface and the first end surface is a bottom surface, the first electrode is exposed to outside the element body in a region spanning from the first end surface to the bottom surface, the second electrode is exposed to outside the element body in a region spanning from the second end surface to the bottom surface, and the inductor wiring includes a wiring portion extending parallel to the main surface from the first end and a via extending in a direction perpendicular to the main surface from the wiring portion. When, in a direction perpendicular to the main surface, a layer in which the wiring portion exists is a wiring layer, a layer in which the via exists is a via layer, and a dimension in a direction perpendicular to the bottom surface is a height dimension, a maximum height dimension of the first electrode in the wiring layer is larger than a maximum height dimension of the first electrode in the via layer.

With the above-described configuration, for example, the exposed area of the first electrode can be increased compared to a case where the maximum height dimension of the first electrode in the wiring layer is equal to the maximum height dimension of the first electrode in the via layer. Therefore, when the inductor component is mounted on a substrate or the like, solder or the like spreads across the surface of the first electrode and the posture of the inductor component with respect to the substrate is stabilized.

When the inductor component is mounted on a substrate, the posture of the inductor component with respect to the substrate is stabilized.

DETAILED DESCRIPTION

First Embodiment

Figure 1:
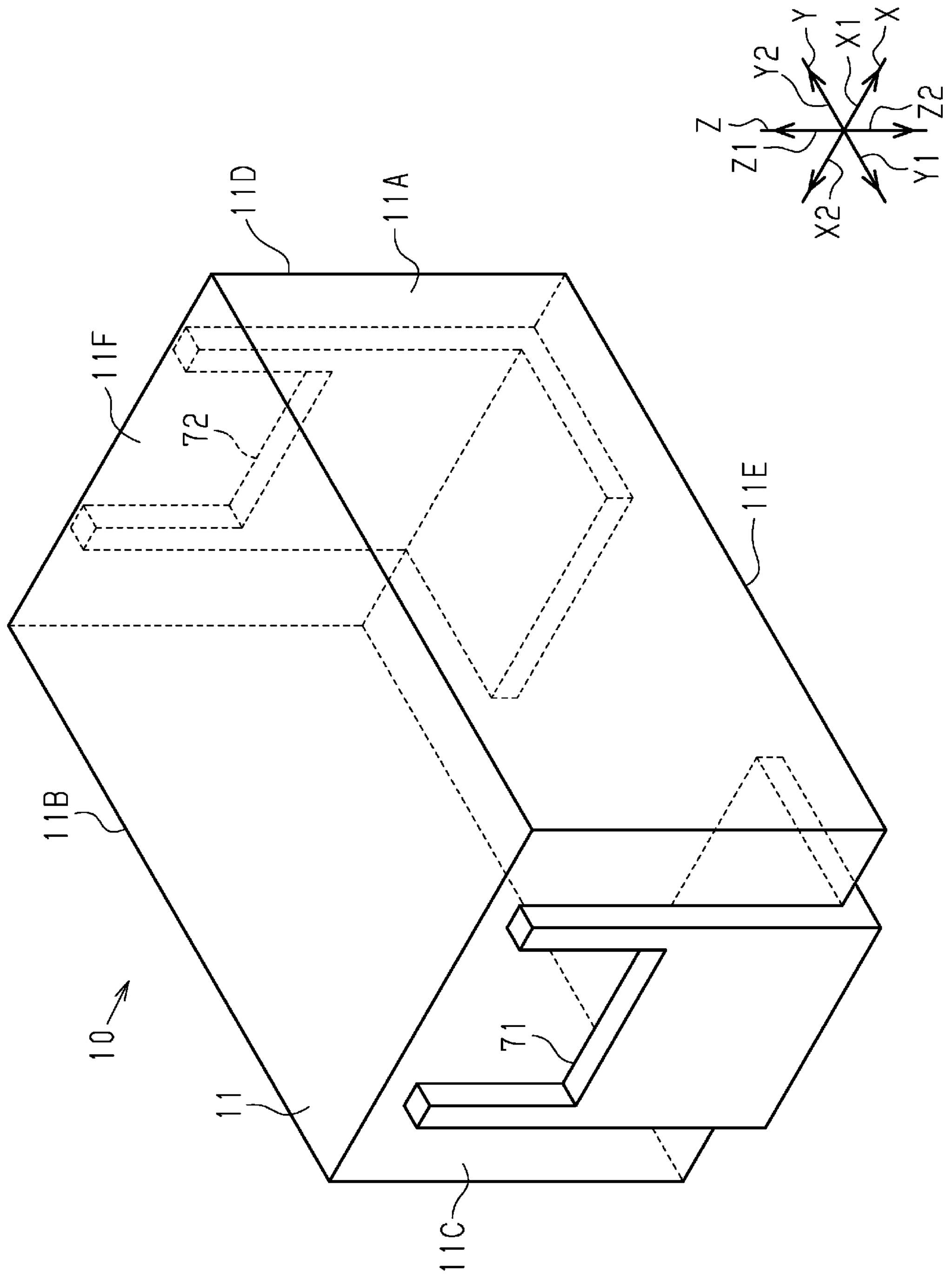
FIG. 1 is a perspective view of an inductor component of a First Embodiment.

Hereafter, an inductor component according to a First Embodiment will be described. In the drawings, constituent elements may be illustrated in an enlarged manner for ease of understanding. The dimensional ratios of the constituent elements may differ from the actual ratios or may differ from the ratios in other drawings.

Overall Configuration

Figure 3:
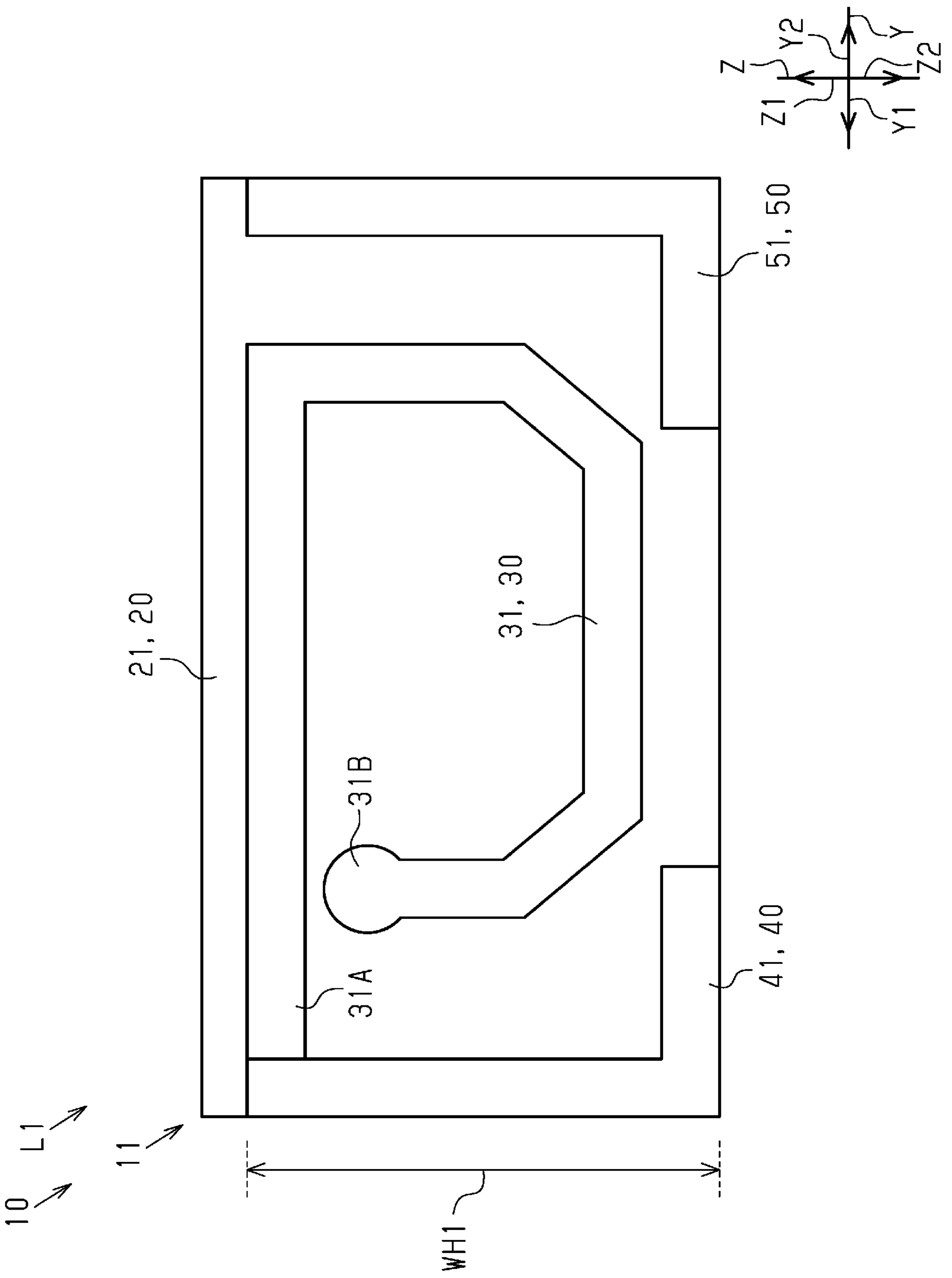
FIG. 3 is a diagram illustrating a first layer of the inductor component of the First Embodiment.

As illustrated in FIG. 1, an inductor component 10 includes a rectangular parallelepiped shaped element body 11. In addition, as illustrated in FIG. 3, the inductor component 10 includes an inductor wiring 30 that extends inside the element body 11, a first electrode 40 that is connected to a first end of the inductor wiring 30, and a second electrode 50 that is connected to a second end of the inductor wiring 30.

Figure 2:
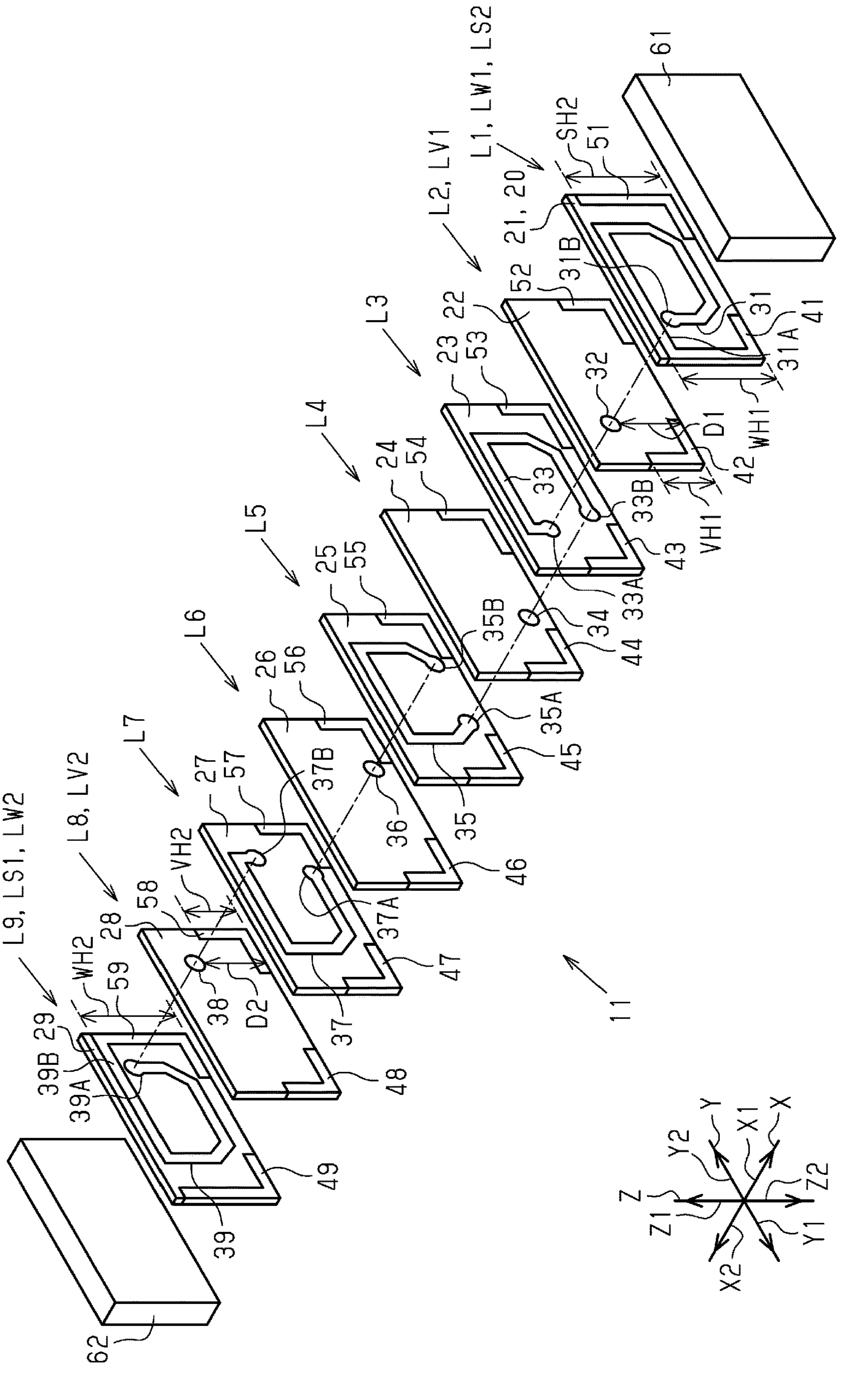
FIG. 2 is an exploded perspective view of the inductor component of the First Embodiment.

As illustrated in FIG. 2, the inductor component 10 has an overall structure in which a plurality of plate-like layers are stacked on top of one another. In addition, each layer has a rectangular shape in plan view. The element body 11 has six outer surfaces due to its rectangular parallelepiped shape. As illustrated in FIG. 1, out of these six outer surfaces, one particular surface that is parallel to the main surface of each layer is as a first main surface 11A. Furthermore, a surface that is parallel to the first main surface 11A is a second main surface 11B. One particular surface that is perpendicular to the first main surface 11A is a first end surface 11C. In addition, a surface that is parallel to the first end surface 11C is referred to as a second end surface 11D. Furthermore, one particular surface that is perpendicular to both the first main surface 11A and the first end surface 11C is referred to as a bottom surface 11E. In addition, the surface that is parallel to the bottom surface 11E is referred to as a top surface 11F.

Note that in the following description, an axis extending in a direction in which the plurality of layers are stacked, i.e., an axis perpendicular to the first main surface 11A is referred to as a first axis X. In addition, an axis that is perpendicular to the first end surface 11C is referred to as a second axis Y. Furthermore, an axis that is perpendicular to the bottom surface 11E is referred to as a third axis Z. Out of directions along the first axis X, the direction in which the first main surface 11A faces is referred to as a first positive direction X1 and the direction opposite to the first positive direction X1 is a first negative direction X2. Furthermore, out of directions along the second axis Y, the direction in which the first end surface 11C faces is referred to as a second positive direction Y1 and the direction opposite to the second positive direction Y1 is a second negative direction Y2. Furthermore, out of directions along the third axis Z, the direction in which the top surface 11F faces is referred to as a third positive direction Z1 and the direction opposite to the third positive direction Z1 is referred to as a third negative direction Z2.

As illustrated in FIG. 2, the inductor component 10 includes first to ninth layers L1 to L9. The first to ninth layers L1 to L9 are arrayed in this order in the first negative direction X2. The first to ninth layers L1 to L9 all have substantially the same thickness, i.e., the dimension in a direction along the X axis. As illustrated in FIG. 3, the first layer L1 consists of a first electrode portion 41, a second electrode portion 51, a first wiring portion 31, and a first insulating portion 21.

The first electrode portion 41 is composed of an electrically conductive material such as silver. The first electrode portion 41 is L-shaped on the whole when the first layer L1 is viewed in the first negative direction X2. The first electrode portion 41 is located on the second positive direction Y1 side and the third negative direction Z2 side relative to the center of the first layer L1 when the first layer L1 is viewed in the first negative direction X2. In other words, the first electrode portion 41 is located in a region that includes a corner on the second positive direction Y1 side and the third negative direction Z2 side relative to the center of the first layer L1 when the first layer L1 is viewed in the first negative direction X2.

The largest dimension of the first electrode portion 41 in a direction along the third axis Z is larger than ½ the dimension of the first layer L1 in a direction along the third axis Z. The largest dimension of the first electrode portion 41 in a direction along the third axis Z is the dimension, in the direction along the third axis Z, of the part of the first electrode portion 41 that extends along the first end surface 11C. In other words, the end of the first electrode portion 41 on the third positive direction Z1 side is located on the third positive direction Z1 side relative to the center of the first layer L1 in a direction along the third axis Z. The largest dimension of the first electrode portion 41 in a direction along the second axis Y is smaller than ½ the dimension of the first layer L1 in a direction along the second axis Y. The largest dimension of the first electrode portion 41 in a direction along the second axis Y is the dimension, in the direction along the second axis Y, of the part of the first electrode portion 41 that extends along the bottom surface 11E. In other words, the end of the first electrode portion 41 on the second negative direction Y2 side is located on the second positive direction Y1 side relative to the center of the first layer L1 in a direction along the second axis Y.

The second electrode portion 51 is composed of an electrically conductive material such as silver. The second electrode portion 51 is L-shaped on the whole when the first layer L1 is viewed in the first negative direction X2. The second electrode portion 51 is located on the second negative direction Y2 side and the third negative direction Z2 side relative to the center of the first layer L1 when the first layer L1 is viewed in the first negative direction X2. In other words, the second electrode portion 51 is located in a region that includes a corner on the second negative direction Y2 side and the third negative direction Z2 side relative to the center of the first layer L1 when the first layer L1 is viewed in the first negative direction X2.

The largest dimension of the second electrode portion 51 in a direction along the third axis Z is larger than ½ the dimension of the first layer L1 in a direction along the third axis Z. The largest dimension of the second electrode portion 51 in a direction along the third axis Z is the dimension, in the direction along the third axis Z, of the part of the second electrode portion 51 that extends along the second end surface 11D. In other words, the end of the second electrode portion 51 on the third positive direction Z1 side is located on the third positive direction Z1 side relative to the center of the first layer L1 in a direction along the third axis Z. The largest dimension of the second electrode portion 51 in a direction along the second axis Y is smaller than ½ the dimension of the first layer L1 in a direction along the second axis Y. The largest dimension of the second electrode portion 51 in a direction along the second axis Y is the dimension, in the direction along the second axis Y, of the part of the second electrode portion 51 that extends along the bottom surface 11E. In other words, the end of the second electrode portion 51 on the second positive direction Y1 side is located on the second negative direction Y2 side relative to the center of the first layer L1 in a direction along the second axis Y.

The first wiring portion 31 is composed of an electrically conductive material such as silver. The first wiring portion 31 extends in a spiral shape on the whole around the center of the first layer L1 when the first layer L1 is viewed in the first negative direction X2. Specifically, a first end portion 31A of the first wiring portion 31 is connected to an end portion of the first electrode portion 41 on the third positive direction Z1 side in a direction along the third axis Z. In other words, the first end portion 31A forms the first end of the inductor wiring 30. The wiring width of the first wiring portion 31 is substantially constant except for at a second end portion 31B thereof. The position of the second end portion 31B of the first wiring portion 31 in a direction along the third axis Z is on the third positive direction Z1 side relative to the center in a direction along the third axis Z and on the third negative direction Z2 side relative to the first end portion 31A. In addition, the position of the second end portion 31B of the first wiring portion 31 in a direction along the second axis Y is on the second positive direction Y1 side relative to the center in a direction along the second axis Y. The first wiring portion 31 extends clockwise from the first end portion 31A to the second end portion 31B when the first wiring portion 31 is viewed in the first negative direction X2.

The second end portion 31B of the first wiring portion 31 functions as a pad for connecting to a via 32, which is described later. The second end portion 31B has a substantially circular shape when the first layer L1 is viewed in the first negative direction X2. In addition, the second end portion 31B of the first wiring portion 31 has a larger wiring width than the rest of the first wiring portion 31.

The parts of the first layer L1 other than the first electrode portion 41, the second electrode portion 51, and the first wiring portion 31 are constituted by the first insulating portion 21. The first insulating portion 21 is composed of a non-magnetic material such as glass, resin, or alumina.

As illustrated in FIG. 2, the second layer L2 is stacked on a main surface of the first layer L1 that faces in the first negative direction X2. The second layer L2 has the same rectangular shape as the first layer L1 when the second layer L2 is viewed in the first negative direction X2. The second layer L2 consists of a third electrode portion 42, a fourth electrode portion 52, the via 32, and a second insulating portion 22.

The third electrode portion 42 is composed of the same material as the first electrode portion 41. The third electrode portion 42 is L-shaped on the whole when the second layer L2 is viewed in the first negative direction X2. The third electrode portion 42 is located on the second positive direction Y1 side and the third negative direction Z2 side relative to the center of the second layer L2 when the second layer L2 is viewed in the first negative direction X2. In other words, the third electrode portion 42 is located in a region that includes a corner on the second positive direction Y1 side and the third negative direction Z2 side relative to the center of the second layer L2 when the second layer L2 is viewed in the first negative direction X2. Therefore, the third electrode portion 42 is stacked on a surface of the first electrode portion 41 that faces in the first negative direction X2.

The largest dimension of the third electrode portion 42 in a direction along the third axis Z is smaller than the dimension of the first electrode portion 41 in the direction along the third axis Z. The largest dimension of the third electrode portion 42 in a direction along the third axis Z is the dimension, in the direction along the third axis Z, of the part of the third electrode portion 42 that extends along the first end surface 11C. Specifically, the position of the end of the third electrode portion 42 on the third positive direction Z1 side is at the center of the second layer L2 along the third axis Z. The largest dimension of the third electrode portion 42 in a direction along the second axis Y is equal to the largest dimension of the first electrode portion 41 in the direction along the second axis Y.

The fourth electrode portion 52 is composed of the same material as the second electrode portion 51. The fourth electrode portion 52 is L-shaped on the whole when the second layer L2 is viewed in the first negative direction X2. The fourth electrode portion 52 is located on the second negative direction Y2 side and the third negative direction Z2 side relative to the center of the second layer L2 when the second layer L2 is viewed in the first negative direction X2. In other words, the fourth electrode portion 52 is located in a region that includes a corner on the second negative direction Y2 side and the third negative direction Z2 side relative to the center of the second layer L2 when the second layer L2 is viewed in the first negative direction X2. Therefore, the fourth electrode portion 52 is stacked on a surface of the second electrode portion 51 that faces in the first negative direction X2.

The largest dimension of the fourth electrode portion 52 in a direction along the third axis Z is smaller than the dimension of the second electrode portion 51 in the direction along the third axis Z. The largest dimension of the fourth electrode portion 52 in a direction along the third axis Z is the dimension, in the direction along the third axis Z, of the part of the fourth electrode portion 52 that extends along the second end surface 11D. Specifically, the position of the end of the fourth electrode portion 52 on the third positive direction Z1 side is at the center of the second layer L2 along the third axis Z. The largest dimension of the fourth electrode portion 52 in a direction along the second axis Y is equal to the largest dimension of the second electrode portion 51 in the direction along the second axis Y.

The via 32 is composed of the same material as the first wiring portion 31. The via 32 has a cylindrical shape that extends in a direction along the first axis X. The via 32 is stacked on a surface of the second end portion 31B of the first wiring portion 31 that faces in the first negative direction X2. Therefore, the via 32 is electrically connected to the second end portion 31B of the first wiring portion 31. The via 32 extends in the first negative direction X2 from the second end portion 31B of the first wiring portion 31.

The parts of the second layer L2 other than the third electrode portion 42, the fourth electrode portion 52, and the via 32 are constituted by the second insulating portion 22. The second insulating portion 22 consists of a non-magnetic insulator composed of the same material as the first insulating portion 21.

The third layer L3 is stacked on a main surface of the second layer L2 that faces in the first negative direction X2. The third layer L3 has the same rectangular shape as the first layer L1 when the third layer L3 is viewed in the first negative direction X2. The third layer L3 consists of a fifth electrode portion 43, a sixth electrode portion 53, a second wiring portion 33, and a third insulating portion 23.

The fifth electrode portion 43 is composed of the same material as the first electrode portion 41. The fifth electrode portion 43 is L shaped with the same dimensions as the third electrode portion 42 and is located at the same place as the third electrode portion 42 when the third layer L3 is viewed in the first negative direction X2. Therefore, the fifth electrode portion 43 is stacked on a surface of the third electrode portion 42 that faces in the first negative direction X2. Since the fifth electrode portion 43 has the same dimensions as the third electrode portion 42, the largest dimension of the fifth electrode portion 43 in a direction along the third axis Z is smaller than the largest dimension of the first electrode portion 41 in the direction along the third axis Z.

The sixth electrode portion 53 is composed of the same material as the second electrode portion 51. The sixth electrode portion 53 is L shaped with the same dimensions as the fourth electrode portion 52 and is located at the same place as the fourth electrode portion 52 when the third layer L3 is viewed in the first negative direction X2. Therefore, the sixth electrode portion 53 is stacked on a surface of the fourth electrode portion 52 that faces in the first negative direction X2. Since the sixth electrode portion 53 has the same dimensions as the fourth electrode portion 52, the largest dimension of the sixth electrode portion 53 in a direction along the third axis Z is smaller than the largest dimension of the second electrode portion 51 in the direction along the third axis Z.

The second wiring portion 33 is composed of the same material as the first wiring portion 31. The second wiring portion 33 extends in a spiral shape around the center of the third layer L3 on the whole when the third layer L3 is viewed in the first negative direction X2. Specifically, the position of a first end portion 33A of the second wiring portion 33 lies on a surface of the via 32 that faces in the first negative direction X2. Therefore, the first end portion 33A of the second wiring portion 33 is connected to the via 32. The wiring width of the second wiring portion 33 is substantially constant except for at the first end portion 33A and a second end portion 33B thereof. The position of the second end portion 33B of the second wiring portion 33 in a direction along the third axis Z is on the third negative direction Z2 side relative to the center in a direction along the third axis Z. In addition, the position of the second end portion 33B of the second wiring portion 33 in a direction along the second axis Y is on the second positive direction Y1 side relative to the center in the direction along the second axis Y and is nearer the center in the direction along the second axis Y than the position of the second end portion 31B of the first wiring portion 31 in the direction along the second axis Y. The second wiring portion 33 extends clockwise from the first end portion 33A to the second end portion 33B when the second wiring portion 33 is viewed in the first negative direction X2.

The parts of the third layer L3 other than the fifth electrode portion 43, the sixth electrode portion 53, and the second wiring portion 33 are constituted by the third insulating portion 23. The third insulating portion 23 consists of a non-magnetic insulator composed of the same material as the first insulating portion 21.

The fourth layer L4 is stacked on a main surface of the third layer L3 that faces in the first negative direction X2. The fourth layer L4 has the same rectangular shape as the first layer L1 when the fourth layer L4 is viewed in the first negative direction X2. The fourth layer L4 consists of a seventh electrode portion 44, an eighth electrode portion 54, a via 34, and a fourth insulating portion 24.

The seventh electrode portion 44 is composed of the same material as the first electrode portion 41. The seventh electrode portion 44 is L shaped with the same dimensions as the fifth electrode portion 43 and is located at the same place as the fifth electrode portion 43 when the fourth layer L4 is viewed in the first negative direction X2. Therefore, the seventh electrode portion 44 is stacked on a surface of the fifth electrode portion 43 that faces in the first negative direction X2. Since the seventh electrode portion 44 has the same dimensions as the fifth electrode portion 43, the largest dimension of the seventh electrode portion 44 in a direction along the third axis Z is smaller than the largest dimension of the first electrode portion 41 in the direction along the third axis Z.

The eighth electrode portion 54 is composed of the same material as the second electrode portion 51. The eighth electrode portion 54 is L shaped with the same dimensions as the sixth electrode portion 53 and is located at the same place as the sixth electrode portion 53 when the fourth layer L4 is viewed in the first negative direction X2. Therefore, the eighth electrode portion 54 is stacked on a surface of the sixth electrode portion 53 that faces in the first negative direction X2. Since the eighth electrode portion 54 has the same dimensions as the sixth electrode portion 53, the largest dimension of the eighth electrode portion 54 in a direction along the third axis Z is smaller than the largest dimension of the second electrode portion 51 in the direction along the third axis Z.

The via 34 is composed of the same material as the first wiring portion 31. The via 34 has a cylindrical shape that extends in a direction along the first axis X. The via 34 is stacked on a surface of the second end portion 33B of the second wiring portion 33 that faces in the first negative direction X2. Therefore, the via 34 is electrically connected to the second end portion 33B of the second wiring portion 33. The via 34 extends in the first negative direction X2 from the second end portion 33B of the second wiring portion 33.

The parts of the fourth layer L4 other than the seventh electrode portion 44, the eighth electrode portion 54, and the via 34 are constituted by the fourth insulating portion 24. The fourth insulating portion 24 consists of a non-magnetic insulator composed of the same material as the first insulating portion 21.

The fifth layer L5 is stacked on a main surface of the fourth layer L4 that faces in the first negative direction X2. The fifth layer L5 has the same rectangular shape as the first layer L1 when the fifth layer L5 is viewed in the first negative direction X2. The fifth layer L5 consists of a ninth electrode portion 45, a tenth electrode portion 55, a third wiring portion 35, and a fifth insulating portion 25.

The ninth electrode portion 45 is composed of the same material as the first electrode portion 41. The ninth electrode portion 45 is L shaped with the same dimensions as the seventh electrode portion 44 and is located at the same place as the seventh electrode portion 44 when the fifth layer L5 is viewed in the first negative direction X2. Therefore, the ninth electrode portion 45 is stacked on a surface of the seventh electrode portion 44 that faces in the first negative direction X2. Since the ninth electrode portion 45 has the same dimensions as the seventh electrode portion 44, the largest dimension of the ninth electrode portion 45 in a direction along the third axis Z is smaller than the largest dimension of the first electrode portion 41 in the direction along the third axis Z.

The tenth electrode portion 55 is composed of the same material as the second electrode portion 51. The tenth electrode portion 55 is L shaped with the same dimensions as the eighth electrode portion 54 and is located at the same place as the eighth electrode portion 54 when the fifth layer L5 is viewed in the first negative direction X2. Therefore, the tenth electrode portion 55 is stacked on a surface of the eighth electrode portion 54 that faces in the first negative direction X2. Since the tenth electrode portion 55 has the same dimensions as the eighth electrode portion 54, the largest dimension of the tenth electrode portion 55 in a direction along the third axis Z is smaller than the largest dimension of the second electrode portion 51 in the direction along the third axis Z.

The third wiring portion 35 is composed of the same material as the first wiring portion 31. The third wiring portion 35 extends in a spiral shape around the center of the fifth layer L5 on the whole when the fifth layer L5 is viewed in the first negative direction X2. Specifically, the position of a first end portion 35A of the third wiring portion 35 lies on a surface of the via 34 that faces in the first negative direction X2. Therefore, the first end portion 35A of the third wiring portion 35 is connected to the via 34. The wiring width of the third wiring portion 35 is substantially constant except for at the first end portion 35A and a second end portion 35B thereof. The position of the second end portion 33B of the third wiring portion 35 in a direction along the third axis Z is on the third negative direction Z2 side relative to the center in a direction along the third axis Z. In addition, the position of the second end portion 33B of the second wiring portion 33 in a direction along the second axis Y is on the second negative direction Y2 side relative to the center in a direction along the second axis Y. The third wiring portion 35 extends clockwise from the first end portion 35A to the second end portion 35B when the third wiring portion 35 is viewed in the first negative direction X2.

The parts of the fifth layer L5 other than the ninth electrode portion 45, the tenth electrode portion 55, and the third wiring portion 35 are constituted by the fifth insulating portion 25. The fifth insulating portion 25 consists of a non-magnetic insulator composed of the same material as the first insulating portion 21.

The sixth layer L6 is stacked on a main surface of the fifth layer L5 that faces in the first negative direction X2. The sixth layer L6 has the same rectangular shape as the first layer L1 when the sixth layer L6 is viewed in the first negative direction X2. The sixth layer L6 consists of an eleventh electrode portion 46, a twelfth electrode portion 56, a via 36, and a sixth insulating portion 26.

The eleventh electrode portion 46 is composed of the same material as the first electrode portion 41. The eleventh electrode portion 46 is L shaped with the same dimensions as the ninth electrode portion 45 and is located at the same place as the ninth electrode portion 45 when the sixth layer L6 is viewed in the first negative direction X2. Therefore, the eleventh electrode portion 46 is stacked on a surface of the ninth electrode portion 45 that faces in the first negative direction X2. Since the eleventh electrode portion 46 has the same dimensions as the ninth electrode portion 45, the largest dimension of the eleventh electrode portion 46 in a direction along the third axis Z is smaller than the largest dimension of the first electrode portion 41 in the direction along the third axis Z.

The twelfth electrode portion 56 is composed of the same material as the second electrode portion 51. The twelfth electrode portion 56 is L shaped with the same dimensions as the tenth electrode portion 55 and is located at the same place as the tenth electrode portion 55 when the sixth layer L6 is viewed in the first negative direction X2. Therefore, the twelfth electrode portion 56 is stacked on a surface of the tenth electrode portion 55 that faces in the first negative direction X2. Since the twelfth electrode portion 56 has the same dimensions as the tenth electrode portion 55, the largest dimension of the twelfth electrode portion 56 in a direction along the third axis Z is smaller than the largest dimension of the second electrode portion 51 in the direction along the third axis Z.

The via 36 is composed of the same material as the first wiring portion 31. The via 36 has a cylindrical shape that extends in a direction along the first axis X. The via 36 is stacked on a surface of the second end portion 35B of the third wiring portion 35 that faces in the first negative direction X2. Therefore, the via 36 is electrically connected to the second end portion 35B of the third wiring portion 35. The via 36 extends in the first negative direction X2 from the second end portion 35B of the third wiring portion 35.

The parts of the sixth layer L6 other than the eleventh electrode portion 46, the twelfth electrode portion 56, and the via 36 are constituted by the sixth insulating portion 26. The sixth insulating portion 26 consists of a non-magnetic insulator composed of the same material as the first insulating portion 21.

The seventh layer L7 is stacked on a main surface of the sixth layer L6 that faces in the first negative direction X2. The seventh layer L7 has the same rectangular shape as the first layer L1 when the seventh layer L7 is viewed in the first negative direction X2. The seventh layer L7 consists of a thirteenth electrode portion 47, a fourteenth electrode portion 57, a fourth wiring portion 37, and a seventh insulating portion 27.

The thirteenth electrode portion 47 is composed of the same material as the first electrode portion 41. The thirteenth electrode portion 47 is L shaped with the same dimensions as the eleventh electrode portion 46 and is located at the same place as the eleventh electrode portion 46 when the seventh layer L7 is viewed in the first negative direction X2. Therefore, the thirteenth electrode portion 47 is stacked on a surface of the eleventh electrode portion 46 that faces in the first negative direction X2. Since the thirteenth electrode portion 47 has the same dimensions as the eleventh electrode portion 46, the largest dimension of the thirteenth electrode portion 47 in a direction along the third axis Z is smaller than the largest dimension of the first electrode portion 41 in the direction along the third axis Z.

The fourteenth electrode portion 57 is composed of the same material as the second electrode portion 51. The fourteenth electrode portion 57 is L shaped with the same dimensions as the twelfth electrode portion 56 and is located at the same place as the eleventh electrode portion 46 when the seventh layer L7 is viewed in the first negative direction X2. Therefore, the fourteenth electrode portion 57 is stacked on a surface of the twelfth electrode portion 56 that faces in the first negative direction X2. Since the fourteenth electrode portion 57 has the same dimensions as the twelfth electrode portion 56, the largest dimension of the fourteenth electrode portion 57 in a direction along the third axis Z is smaller than the largest dimension of the second electrode portion 51 in the direction along the third axis Z.

The fourth wiring portion 37 is composed of the same material as the first wiring portion 31. The fourth wiring portion 37 extends in a spiral shape around the center of the seventh layer L7 on the whole when the seventh layer L7 is viewed in the first negative direction X2. Specifically, the position of a first end portion 37A of the fourth wiring portion 37 lies on a surface of the via 36 that faces in the first negative direction X2. Therefore, the first end portion 37A of the fourth wiring portion 37 is connected to the via 36. The wiring width of the fourth wiring portion 37 is substantially constant except for at the first end portion 37A and a second end portion 37B thereof. The position of the second end portion 37B of the fourth wiring portion 37 in a direction along the third axis Z is on the third positive direction Z1 side relative to the center in a direction along the third axis Z. In addition, the position of the second end portion 37B of the fourth wiring portion 37 in a direction along the second axis Y is on the second negative direction Y2 side relative to the center in the direction along the second axis Y and is on the second negative direction Y2 side relative to the position of the first end portion 37A in the direction along the second axis Y. The fourth wiring portion 37 extends clockwise from the first end portion 37A to the second end portion 37B when the fourth wiring portion 37 is viewed in the first negative direction X2. In addition, the fourth wiring portion 37 has rotational symmetry with the second wiring portion 33 with the axis of rotation being an axis in a direction along the third axis Z passing through the center in the direction of extension of the inductor wiring 30.

The parts of the seventh layer L7 other than the thirteenth electrode portion 47, the fourteenth electrode portion 57, and the fourth wiring portion 37 are constituted by the seventh insulating portion 27. The seventh insulating portion 27 consists of a non-magnetic insulator composed of the same material as the first insulating portion 21.

The eighth layer L8 is stacked on a main surface of the seventh layer L7 that faces in the first negative direction X2. The eighth layer L8 has the same rectangular shape as the first layer L1 when the eighth layer L8 is viewed in the first negative direction X2. The eighth layer L8 consists of an fifteenth electrode portion 48, a sixteenth electrode portion 58, a via 38, and an eighth insulating portion 28.

The fifteenth electrode portion 48 is composed of the same material as the first electrode portion 41. The fifteenth electrode portion 48 is L shaped with the same dimensions as the thirteenth electrode portion 47 and is located at the same place as the thirteenth electrode portion 47 when the eighth layer L8 is viewed in the first negative direction X2. Therefore, the fifteenth electrode portion 48 is stacked on a surface of the thirteenth electrode portion 47 that faces in the first negative direction X2. Since the fifteenth electrode portion 48 has the same dimensions as the thirteenth electrode portion 47, the largest dimension of the fifteenth electrode portion 48 in a direction along the third axis Z is smaller than the largest dimension of the first electrode portion 41 in the direction along the third axis Z.

The sixteenth electrode portion 58 is composed of the same material as the second electrode portion 51. The sixteenth electrode portion 58 is L shaped with the same dimensions as the fourteenth electrode portion 57 and is located at the same place as the fourteenth electrode portion 57 when the eighth layer L8 is viewed in the first negative direction X2. Therefore, the sixteenth electrode portion 58 is stacked on a surface of the fourteenth electrode portion 57 that faces in the first negative direction X2. Since the sixteenth electrode portion 58 has the same dimensions as the fourteenth electrode portion 57, the largest dimension of the sixteenth electrode portion 58 in a direction along the third axis Z is smaller than the largest dimension of the second electrode portion 51 in the direction along the third axis Z.

The via 38 is composed of the same material as the first wiring portion 31. The via 38 has a cylindrical shape that extends in a direction along the first axis X. The via 38 is stacked on a surface of the second end portion 37B of the fourth wiring portion 37 that faces in the first negative direction X2. Therefore, the via 38 is electrically connected to the second end portion 37B of the fourth wiring portion 37. The via 38 extends in the first negative direction X2 from the second end portion 37B of the fourth wiring portion 37.

The parts of the eighth layer L8 other than the fifteenth electrode portion 48, the sixteenth electrode portion 58, and the via 38 are constituted by the eighth insulating portion 28. The eighth insulating portion 28 consists of a non-magnetic insulator composed of the same material as the first insulating portion 21.

The ninth layer L9 is stacked on a main surface of the eighth layer L8 that faces in the first negative direction X2. The ninth layer L9 has the same rectangular shape as the first layer L1 when the ninth layer L9 is viewed in the first negative direction X2. The ninth layer L9 consists of a seventeenth electrode portion 49, an eighteenth electrode portion 59, a fifth wiring portion 39, and a ninth insulating portion 29.

The seventeenth electrode portion 49 is composed of the same material as the first electrode portion 41. The seventeenth electrode portion 49 is L shaped with the same dimensions as the first electrode portion 41 and is located at the same place as the first electrode portion 41 when the ninth layer L9 is viewed in the first negative direction X2. Therefore, the seventeenth electrode portion 49 is stacked on a surface of the fifteenth electrode portion 48 that faces in the first negative direction X2.

The eighteenth electrode portion 59 is composed of the same material as the second electrode portion 51. The eighteenth electrode portion 59 is L shaped with the same dimensions as the second electrode portion 51 and is located at the same place as the second electrode portion 51 when the ninth layer L9 is viewed in the first negative direction X2. Therefore, the eighteenth electrode portion 59 is stacked on a surface of the sixteenth electrode portion 58 that faces in the first negative direction X2.

The fifth wiring portion 39 is composed of the same material as the first wiring portion 31. The fifth wiring portion 39 extends in a spiral shape around the center of the ninth layer L9 on the whole when the ninth layer L9 is viewed in the first negative direction X2. Specifically, the position of a first end portion 39A of the fifth wiring portion 39 lies on a surface of the via 38 that faces in the first negative direction X2. Therefore, the first end portion 39A of the fifth wiring portion 39 is connected to the via 38. The wiring width of the fifth wiring portion 39 is substantially constant except for at the first end portion 39A thereof. A second end portion 39B of the fifth wiring portion 39 is connected to an end portion of the eighteenth electrode portion 59 on the third positive direction Z1 side in a direction along the third axis Z. The fifth wiring portion 39 extends clockwise from the first end portion 39A to the second end portion 39B when the fifth wiring portion 39 is viewed in the first negative direction X2. The second end portion 39B of the fifth wiring portion 39 forms the second end of the inductor wiring 30. Furthermore, the fifth wiring portion 39 has rotational symmetry with the first wiring portion 31 with the axis of rotation being an axis in a direction along the third axis Z passing through the center in the direction of extension of the inductor wiring 30.

The parts of the ninth layer L9 other than the seventeenth electrode portion 49, the eighteenth electrode portion 59, and the fifth wiring portion 39 are constituted by the ninth insulating portion 29. The ninth insulating portion 29 consists of an insulator composed of the same material as the first insulating portion 21.

The element body 11 includes a first coating insulating layer 61 and a second coating insulating layer 62. The first coating insulating layer 61 has the same rectangular shape as the first layer L1 when the first coating insulating layer 61 is viewed in the first negative direction X2. The first coating insulating layer 61 is stacked on a main surface of the first layer L1 that faces in the first positive direction X1. The second coating insulating layer 62 has the same rectangular shape as the first layer L1 when the second coating insulating layer 62 is viewed in the first positive direction X1. The second coating insulating layer 62 is stacked on a main surface of the ninth layer L9 that faces in the first negative direction X2.

The first coating insulating layer 61 and the second coating insulating layer 62 are different colors from the first to ninth insulating portions 21 to 29. For example, the first coating insulating layer 61 and the second coating insulating layer 62 contain pigments such as blue and black. This makes it possible to determine the orientation of the inductor component 10 from the outer surfaces of the element body 11.

The first to ninth insulating portions 21 to 29, the first coating insulating layer 61, and the second coating insulating layer 62 described above are integrated with each other. Hereafter, when there is no need to distinguish between these components, the components are collectively referred to as an insulating portion 20.

In addition, the first wiring portion 31, the second wiring portion 33, the third wiring portion 35, the fourth wiring portion 37, the fifth wiring portion 39, the via 32, the via 34, the via 36, and the via 38 are integrated with each other. Hereafter, when there is no need to distinguish between these components, the components are collectively referred to as the inductor wiring 30. The inductor wiring 30 is wound in a spiral shape on the whole. A center axis around which the inductor wiring 30 is wound is an axis that extends in a direction along the first axis X.

In addition, the first electrode portion 41, the third electrode portion 42, the fifth electrode portion 43, the seventh electrode portion 44, the ninth electrode portion 45, the eleventh electrode portion 46, the thirteenth electrode portion 47, the fifteenth electrode portion 48, and the seventeenth electrode portion 49 described above are integrated with each other. Together these portions form the first electrode 40.

Similarly, the second electrode portion 51, the fourth electrode portion 52, the sixth electrode portion 53, the eighth electrode portion 54, the tenth electrode portion 55, the twelfth electrode portion 56, the fourteenth electrode portion 57, the sixteenth electrode portion 58, and the eighteenth electrode portion 59 described above are integrated with each other. Together these portions form the second electrode 50.

In this embodiment, the element body 11 of the inductor component 10 is formed of the insulating portion 20, the first electrode 40, and the second electrode 50. The inductor wiring 30 extends inside the element body 11. The inductor wiring 30, the first electrode 40, and the second electrode 50 may be integrated with each other. In other words, there does not have to be a physical boundary between the inductor wiring 30 and the first electrode 40.

The first to ninth layers L1 to L9, the first coating insulating layer 61, and the second coating insulating layer 62 are stacked on top of one another, and as a result, the element body 11 has an overall rectangular shape, as illustrated in FIG. 1. As illustrated in FIG. 3, the first electrode 40 is exposed to outside the element body 11 in a region spanning from the first end surface 11C to the bottom surface 11E. In addition, the second electrode 50 is exposed to outside the element body 11 in a region spanning from the second end surface 11D to the bottom surface 11E.

As illustrated in FIG. 1, the inductor component 10 includes a first coating electrode 71 and a second coating electrode 72. The first coating electrode 71 covers a surface of the first electrode 40 that is exposed to the outside from the element body 11. Although not illustrated, the first coating electrode 71 has a two-layer structure consisting of a nickel plating layer and a tin plating layer.

The second coating electrode 72 covers a surface of the second electrode 50 that is exposed to the outside from the element body 11. Although not illustrated, the second coating electrode 72 has a two-layer structure consisting of a nickel plating layer and a tin plating layer. Note that illustration of the first coating electrode 71 and the second coating electrode 72 is omitted from FIG. 2.

Height Dimension of First Electrode

As described above, the first wiring portion 31 extends parallel to a direction along the first main surface 11A from the first end of the inductor wiring 30. In addition, the via 32 extends from the first wiring portion 31 in a direction along the first axis X, which is a direction perpendicular to the first main surface 11A.

Figure 4:
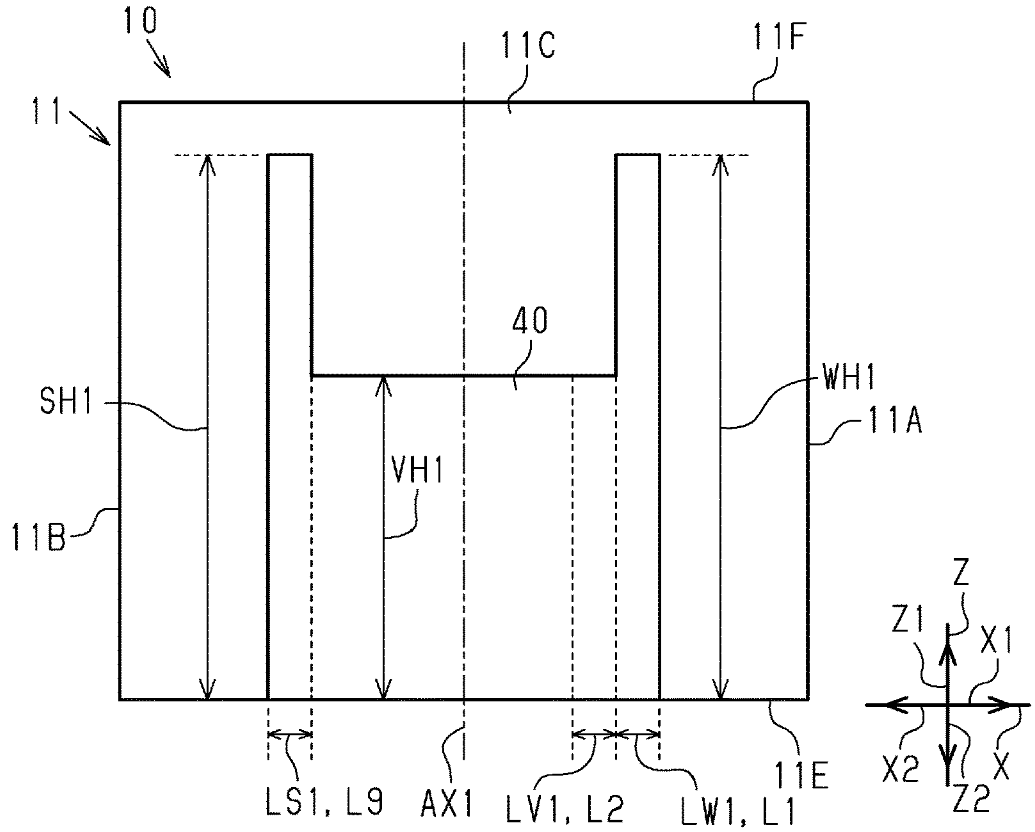
FIG. 4 is a diagram illustrating a first end surface of an element body of the inductor component of the First Embodiment.

As illustrated in FIG. 4, the first layer L1, which is the layer where the first wiring portion 31 is present, is referred to as a first wiring layer LW1 in a direction along the first axis X. In addition, the second layer L2 in which the via 32 that extends from the first wiring portion 31 in a direction along the first axis X is present is referred to as a first via layer LV1. A dimension in a direction perpendicular to the bottom surface 11E is referred to as a height dimension.

The range of the first wiring layer LW1 in a direction along the first axis X is a range from the end of the first wiring portion 31 on the first positive direction X1 side to the end of the first wiring portion 31 on the first negative direction X2 side. In other words, the range of the first wiring layer LW1 in a direction along the first axis X matches the size of the dimension of the first wiring portion 31 in a direction along the first axis X. Similarly, the range of the first via layer LV1 in a direction along the first axis X is a range from the end of the first wiring portion 31 on the first negative direction X2 side to the end of the second wiring portion 33 on the first positive direction X1 side. In other words, the range of the first via layer LV1 in a direction along the first axis X is a range from the end of the via 32 on the first positive direction X1 side to the end of the via 32 on the first negative direction X2 side. Therefore, the range of the first via layer LV1 in a direction along the first axis X matches the size of the dimension of the via 32 in a direction along the first axis X.

The maximum height dimension of the first electrode 40 in the first wiring layer LW1 is referred to as a first wiring layer height WH1. In other words, the first wiring layer height WH1 is the dimension, in a direction along the third axis Z, of the part of the first electrode portion 41 in the first wiring layer LW1 that extends along the first end surface 11C. The maximum height dimension of the first electrode 40 in the first via layer LV1 is referred to as a first via layer height VH1. In other words, the first via layer height VH1 is the dimension, in a direction along the third axis Z, of the part of the third electrode portion 42 in the first via layer LV1 that extends along the first end surface 11C. The first wiring layer height WH1 is larger than the first via layer height VH1. The value obtained by dividing the first wiring layer height WH1 by the first via layer height VH1 is from 1.05 to 1.95. Specifically, the value obtained by dividing the first wiring layer height WH1 by the first via layer height VH1 is 1.8.

In addition, as illustrated in FIG. 2, the distance from the bottom surface 11E to the end of the via 32 on the third negative direction Z2 side in a direction along the third axis Z is referred to as a first via height D1. The first wiring layer height WH1 is larger than the first via height D1. Furthermore, as illustrated in FIG. 2, the first via layer height VH1 is smaller than the first via height D1.

As illustrated in FIG. 4, an axis that is parallel to the third axis Z and passes through the center of the first electrode 40 in a direction along the first axis X is referred to as a first symmetry axis AX1. The ninth layer L9, which is a layer located symmetrical to the first wiring layer LW1 with respect to the first symmetry axis AX1, is referred to as a first symmetrical layer LS1. In this case, the maximum height dimension of the first electrode 40 in the first symmetrical layer LS1 is referred to as a first symmetrical layer height SH1. Therefore, the first symmetrical layer height SH1 is the dimension, in a direction along the third axis Z, of the part of the seventeenth electrode portion 49 in the first symmetrical layer LS1 that extends along the first end surface 11C. The first symmetrical layer height SH1 is larger than the first via layer height VH1 and the first symmetrical layer height SH1 is identical to the first wiring layer height WH1. In other words, in this embodiment, the shape of the part of the first electrode 40 that is exposed to outside the element body 11 is a shape having linear symmetry with the first symmetry axis AX1 being the axis of symmetry.

As described above, the fifth wiring portion 39 extends parallel to a direction along the first main surface 11A from the second end of the inductor wiring 30. Furthermore, the via 38 extends from the fifth wiring portion 39 in a direction along the first axis X, which is a direction perpendicular to the first main surface 11A.

As illustrated in FIG. 2, the ninth layer L9, which is the layer where the fifth wiring portion 39 is present, is referred to as a second wiring layer LW2 in a direction along the first axis X. Furthermore, the eighth layer L8 in which the via 38 that extends from the fifth wiring portion 39 in a direction along the first axis X is present is referred to as a second via layer LV2.

The maximum height dimension of the first electrode 40 in the second wiring layer LW2 is the dimension, in a direction along the third axis Z, of the part of the seventeenth electrode portion 49 in the second wiring layer LW2 that extends along the first end surface 11C. In this embodiment, the maximum height dimension of the first electrode 40 in the second wiring layer LW2 matches the first symmetrical layer height SH1. The maximum height dimension of the first electrode 40 in the second wiring layer LW2 is larger than the first via layer height VH1.

Height Dimension of Second Electrode

The maximum height dimension of the second electrode 50 in the second wiring layer LW2 is referred to as a second wiring layer height WH2. In other words, the second wiring layer height WH2 is the dimension, in a direction along the third axis Z, of the part of the eighteenth electrode portion 59 in the second wiring layer LW2 that extends along the second end surface 11D. In addition, the maximum height dimension of the second electrode 50 in the second via layer LV2 is referred to as a second via layer height VH2. In other words, the second via layer height VH2 is the dimension, in a direction along the third axis Z, of the part of the sixteenth electrode portion 58 in the second via layer LV2 that extends along the second end surface 11D. The second wiring layer height WH2 is larger than the second via layer height VH2. The value obtained by dividing the second wiring layer height WH2 by the second via layer height VH2 is from 1.05 to 1.95. Specifically, the value obtained by dividing the second wiring layer height WH2 by the second via layer height VH2 is 1.8. In addition, regarding the second wiring layer height WH2, the distance from the bottom surface 11E to the end of the via 38 in the third negative direction Z2 in a direction along the third axis Z is referred to as a second via height D2. The second wiring layer height WH2 is larger than the second via height D2. Furthermore, the second via layer height VH2 is smaller than the second via height D2.

Here, an axis that is parallel to the third axis Z and passes through the center of the second electrode 50 in a direction along the first axis X is referred to as a second symmetry axis. The first layer L1, which is a layer located symmetrical to the second wiring layer LW2 with respect to the second symmetry axis, is referred to as a second symmetrical layer LS2. In this case, a second symmetrical layer height SH2, which is the height dimension of the second electrode 50 in the second symmetrical layer LS2, is larger than the second via layer height VH2. In addition, the second symmetrical layer height SH2 is equal to the second wiring layer height WH2. In other words, in this embodiment, the shape of the part of the second electrode 50 that is exposed to outside the element body 11 is a shape having linear symmetry with the second symmetry axis being the axis of symmetry.

An axis that is parallel to the third axis Z and passes through the center of the element body 11 when the element body 11 is viewed in the third negative direction Z2 is referred to as a rotational center axis. At this time, the first electrode 40 and the second electrode 50 have two-fold symmetrical shapes around the rotational center axis.

In addition, the maximum height dimension of the second electrode 50 in the first wiring layer LW1 is the dimension, in a direction along the third axis Z, of the part of the second electrode portion 51 in the first wiring layer LW1 that extends along the second end surface 11D. In this embodiment, the maximum height dimension of the second electrode 50 in the first wiring layer LW1 matches the second symmetrical layer height SH2. The maximum height dimension of the second electrode 50 in the first wiring layer LW1 is larger than the second via layer height VH2.

Height Dimensions of Coating Electrodes

When the inductor component 10 is viewed in the second negative direction Y2, the part of the first coating electrode 71 located in a range where the first wiring layer LW1 exists in a direction along the first axis X is referred to as a position corresponding to the first wiring layer LW1. In this case, the maximum height dimension of the first coating electrode 71 at the position corresponding to the first wiring layer LW1 is larger than the maximum height dimension of the first coating electrode 71 at a position corresponding to the first via layer LV1. Furthermore, the maximum height dimension of the first coating electrode 71 at the position corresponding to the first wiring layer LW1 is smaller than the maximum height dimension of the first end surface 11C of the element body 11.

When the inductor component 10 is viewed in the second positive direction Y1, the part of the second coating electrode 72 located in a range where the second wiring layer LW2 exists in a direction along the first axis X is referred to as a position corresponding to the second wiring layer LW2. In this case, it is larger than the maximum height dimension of the second coating electrode 72 at the position corresponding to the second wiring layer LW2. Furthermore, the maximum height dimension of the second coating electrode 72 at the position corresponding to the second wiring layer LW2 is smaller than the maximum height dimension of the second end surface 11D of the element body 11.

It is assumed that the first electrode portion 41 and the seventeenth electrode portion 49 have the same shape as the third electrode portion 42 and that the second electrode portion 51 and the eighteenth electrode portion 59 have the same shape as the fourth electrode portion 52. In other words, the first electrode 40 and the second electrode 50 are assumed to be shaped on the whole like a letter L obtained by bending a rectangular plate at a right angle. In this case, the height dimension of the first electrode 40 is the same regardless of the position in a direction along the first axis X. If the height dimension of the first electrode 40 is small, the area of the first electrode 40 exposed to outside the element body 11 is small. In this case, when the inductor component 10 is mounted on a substrate, the amount of solder adhered to the first electrode 40 may be small or solder may be adhered to the first electrode 40 in a localized manner. Consequently, the posture of the inductor component 10 with respect the substrate is unstable, and therefore the inductor component 10 may be mounted on the substrate in a tilted state. This would also be the case for the second electrode 50.

Effects of First Embodiment

The First Embodiment exhibits the following effects. Note that effects that are common to both the first electrode 40 and the second electrode 50 are described using the first electrode 40 as a representative example and description for the second electrode 50 is omitted.

(1-1) According to the First Embodiment, the first wiring layer height WH1 is larger than the first via layer height VH1. Therefore, for example, the area of the first electrode 40 exposed to outside the element body 11 is larger than in the case where the first wiring layer height WH1 is equal to the first via layer height VH1. Therefore, when the inductor component 10 is mounted on a substrate or the like, solder or the like spreads across the surface of the first electrode 40, and therefore the posture of the inductor component 10 with respect to the substrate is stabilized.

(1-2) According to the First Embodiment, the first via layer height VH1 is smaller than the first wiring layer height WH1. Therefore, for example, a stray capacitance generated between the first electrode 40 and the via 32 in the first via layer LV1 can be reduced compared to the case where the first via layer height VH1 is the same as the first wiring layer height WH1.

(1-3) According to the First Embodiment, the first via layer height VH1 is smaller than the first via height D1. Therefore, the first electrode 40 does not overlap the via 32 when the inductor component 10 is viewed in the second negative direction Y2. Therefore, a stray capacitance generated between the first electrode 40 and the via 32 can be reduced.

(1-4) According to the First Embodiment, the first symmetrical layer height SH1 is larger than the first via layer height VH1. In other words, the height dimension of the first electrode 40 in the first wiring layer LW1 and the height dimension of the first electrode 40 in the first symmetrical layer LS1, which are layers located symmetrical to each other, are both larger than the first via layer height VH1. In other words, there are parts where the first electrode 40 is exposed to outside the element body 11 across large areas at symmetrical positions across the first symmetry axis AX1. Therefore, the inductor component 10 can be firmly fixed to a substrate at parts on both sides of the first symmetry axis AX1.

(1-5) According to the First Embodiment, the first symmetrical layer height SH1 is equal to the first via layer height VH1. Therefore, the inductor component 10 is easily fixed to a substrate with the same degree of firmness at parts on both sides of the first symmetry axis AX1. In addition, due to the height dimension of the first electrode 40 being identical in the parts on both sides of the first symmetry axis AX1 in this way, the amounts of solder on the first positive direction X1 side and the first negative direction X2 side become uniform and this contributes to stabilizing the posture of the inductor component 10.

(1-6) According to the First Embodiment, a value obtained by dividing the first wiring layer height WH1 by the first via layer height VH1 is from 1.05 to 1.95. The first wiring layer height WH1 is at least 5% larger than the first via layer height VH1, and therefore a larger area of the first electrode 40 exposed to outside the element body 11 in the first wiring layer LW1 can be secured. Furthermore, since the first wiring layer height WH1 is not more than 95% larger than the first via layer height VH1, the area of the first electrode 40 in the first via layer LV1 exposed to outside the element body 11 does not have to be excessively reduced.

(1-7) According to the First Embodiment, the first electrode 40 and the second electrode 50 have shapes having two-fold symmetry around a rotational center axis that is parallel to the third axis Z and passes through the center of the element body 11 when the element body 11 is viewed in the third negative direction Z2. Therefore, when mounting the inductor component 10 on a substrate, it is possible to suppress tilting of the posture of the inductor component 10 between the first electrode 40 side and the second electrode 50 side when looking along the rotational center axis.

(1-8) According to the First Embodiment, the maximum height dimension of the first electrode 40 in the second wiring layer LW2 is larger than the first via layer height VH1. In other words, the maximum height dimension of the first electrode 40 in the first wiring layer LW1 and the maximum height dimension of the first electrode 40 in the second wiring layer LW2, which are the layers at positions at both ends in a direction along the first axis X, are both larger than the first via layer height VH1. There are large parts of the first electrode 40 that are exposed to outside the element body 11 on both sides of the first via layer LV1. Therefore, the inductor component 10 can be firmly fixed to a substrate at parts on both sides of the first symmetry axis AX1.

(1-9) According to the First Embodiment, the maximum height dimension of the first coating electrode 71 at the position corresponding to the first wiring layer LW1 is larger than the maximum height dimension of the first coating electrode 71 at the position corresponding to the first via layer LV1. Therefore, the posture of the inductor component 10 with respect to the substrate is stable when the inductor component 10 is mounted on a substrate or the like even when the first coating electrode 71 covers the first electrode 40.

(1-10) According to the First Embodiment, the maximum height dimension of the first coating electrode 71 at the position corresponding to the first wiring layer LW1 is smaller than the maximum height dimension of the first end surface 11C of the element body 11. Therefore, the first coating electrode 71 does not reach the top surface 11F. Therefore, in the inductor component 10, electrical leakage from the first coating electrode 71 to the top surface 11F can be prevented. For example, in the case where the inductor component 10 is mounted on a substrate or the like, a short circuit with a component disposed on the top surface 11F side of the inductor component 10 can be prevented.

Second Embodiment

Hereafter, an inductor component of a Second Embodiment will be described while referring to the drawings. In an inductor component 110 of the Second Embodiment, the shape of the part of the first electrode 40 that is exposed to outside the element body 11 is different from that in the inductor component 10 of the First Embodiment. Hereafter, the description will focus on points that are different from in the inductor component 10 of the First Embodiment, and description of points that are the same will be simplified or omitted.

Figure 5:
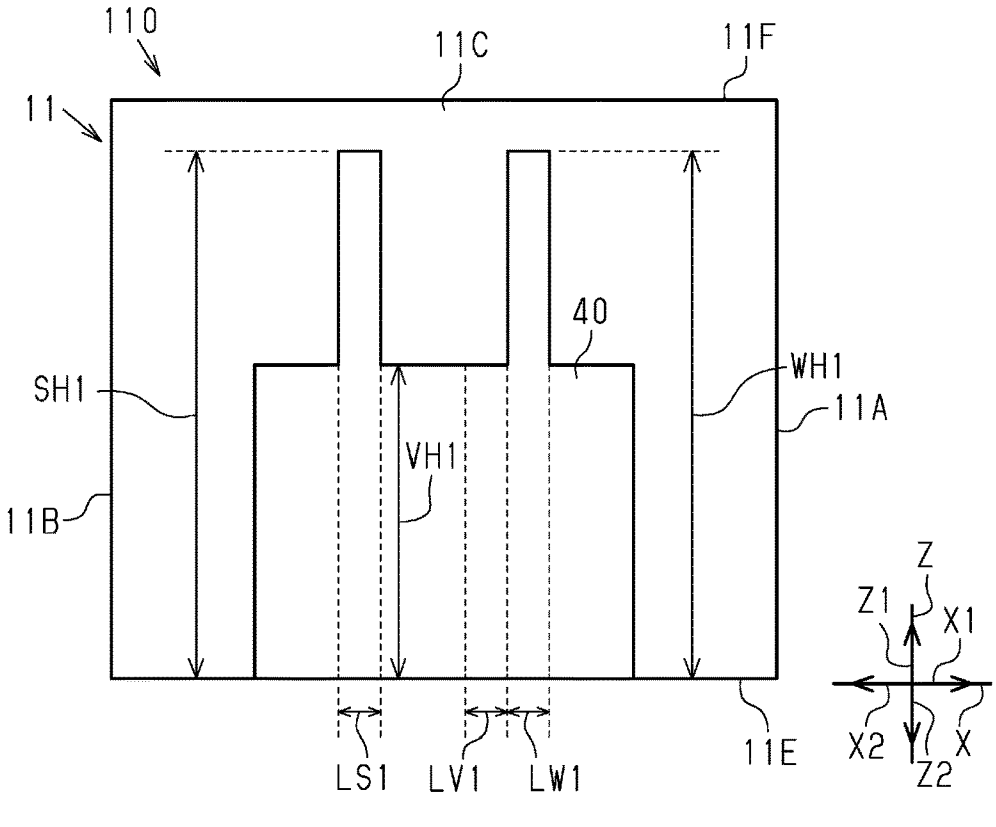
FIG. 5 is a diagram illustrating a first end surface of an element body of an inductor component of a Second Embodiment.

As illustrated in FIG. 5, in the inductor wiring 30 of the inductor component 110, the position of the first wiring layer LW1 in a direction along the first axis X is different from in the First Embodiment. More specifically, compared to the inductor wiring 30 in the First Embodiment, the first wiring layer LW1 is located nearer the center in a direction along the first axis X. Similarly, in the inductor wiring 30 of the inductor component 110, the position of the first symmetrical layer LS1 in a direction along the first axis X is different from that in the First Embodiment. More specifically, compared to the inductor wiring 30 in the First Embodiment, the first symmetrical layer LS1 is located nearer the center in a direction along the first axis X. Although not illustrated, the inductor wiring 30 of the Second Embodiment has a smaller number of wound turns than the inductor wiring 30 of the First Embodiment. Therefore, the positions of the first wiring layer LW1 and the first symmetrical layer LS1 are closer to the center in a direction along the first axis X compared to the First Embodiment.

The end of the first electrode 40 on the first main surface 11A side in a direction along the first axis X is located towards the first main surface 11A side looking from the first wiring layer LW1. In addition, the end of the first electrode 40 on the second main surface 11B side in a direction along the first axis X is located towards the second main surface 11B side looking from the first symmetrical layer LS1. In other words, the dimension of the first electrode 40 in a direction along the first axis X is larger than the distance from the end of the first wiring layer LW1 on the first main surface 11A side to the end of the first symmetrical layer LS1 on the second main surface 11B side. The second electrode 50 is configured in the same way as the first electrode 40.

Effects of Second Embodiment

In addition to the effects (1-1) to (1-10) of the First Embodiment, the Second Embodiment exhibits the following effect.

(2-1) According to the Second Embodiment, the dimension of the first electrode 40 in a direction along the first axis X can be increased compared to the case where the end of the first electrode 40 on the first main surface 11A side is aligned with the end of the first wiring layer LW1 on the first main surface 11A side. Therefore, it is easy to increase the area of the first electrode 40 exposed to outside the element body 11.

Third Embodiment

Hereafter, an inductor component of a Second Embodiment will be described while referring to the drawings. In an inductor component 210 of the Third Embodiment, the first symmetrical layer height SH1 and the second symmetrical layer height SH2 are different from those in the inductor component 10 of the First Embodiment. Hereafter, the description will focus on points that are different from in the inductor component 10 of the First Embodiment, and description of points that are the same will be simplified or omitted.

Figure 6:
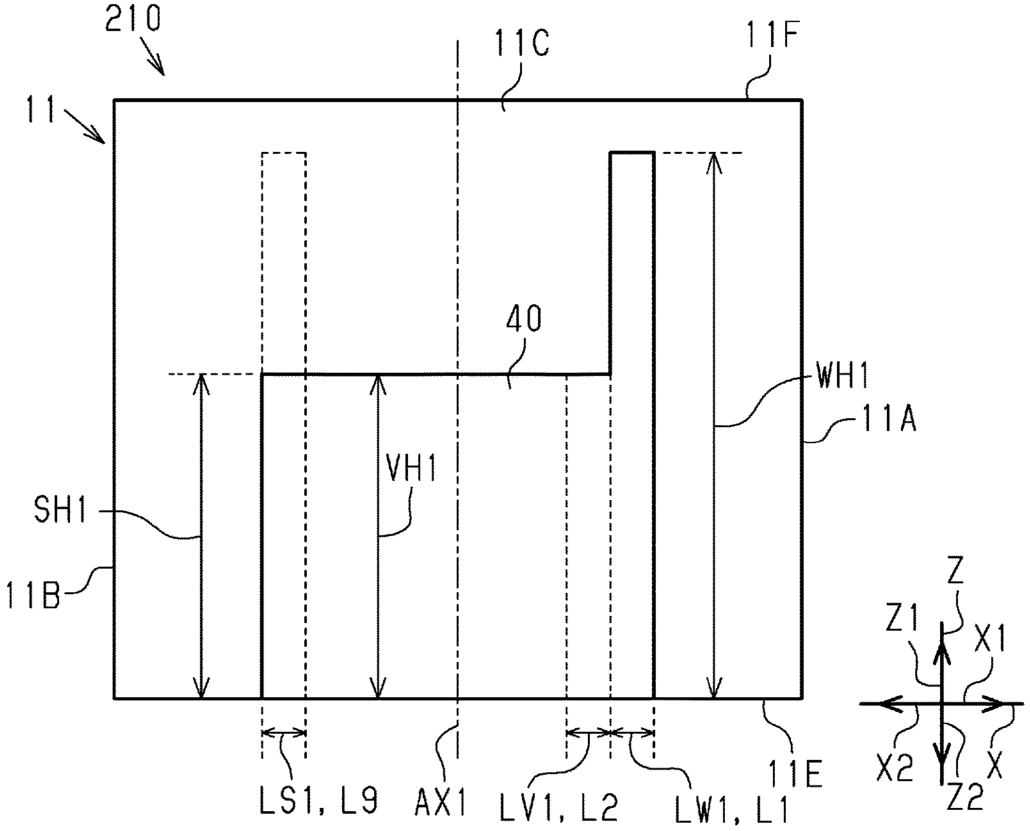
FIG. 6 is a diagram illustrating a first end surface of an element body of an inductor component of a Third Embodiment.

As illustrated in FIG. 6, the first symmetrical layer height SH1 is smaller than the first wiring layer height WH1. In particular, the seventeenth electrode portion 49 has the same dimensions and the same L shape as the third electrode portion 42. Therefore, the height dimension of the first electrode 40 is constant except for in the first wiring layer LW1. Therefore, the maximum height dimension of the first electrode 40 in parts other than the first wiring layer LW1 is smaller than the first wiring layer height WH1. For the second electrode 50, similarly, the maximum height dimension of the second electrode 50 in parts other than the second wiring layer LW2 is smaller than the second wiring layer height WH2.

Effects of Third Embodiment

In addition to the effects (1-1) to (1-3) and (1-6) to (1-10) of the First Embodiment, the Third Embodiment exhibits the following effect.

(3-1) According to the Third Embodiment, for the first electrode 40, the area of the first electrode 40 exposed to outside the element body 11 in parts except for the first wiring layer LW1 is comparatively small. Therefore, a stray capacitance generated between the inductor wiring 30 and the first electrode 40 can be reduced.

Other Embodiments

The above-described embodiments can be modified in the following ways. The embodiments and the following modifications can be combined with each other to the extent that they are not technically inconsistent. Note that points that are common to the first electrode 40 and the second electrode 50 are described using the first electrode 40 as a representative example and description for the second electrode 50 is omitted.

The first to ninth layers L1 to L9 do not all have to have substantially the same thickness, i.e., dimension in a direction along the X axis. All of the layers may have different thicknesses or the thicknesses of some of the layers may be different from the thickness of other layers.

The element body 11 may be a rectangular parallelepiped that is long in a direction along the first axis X or may be a rectangular parallelepiped that is long in a direction along the third axis Z. Furthermore, the element body 11 may be a rectangular parallelepiped having an identical dimensions in directions along the first axis X, the second axis Y, and the third axis Z. For example, with respect to the dimensions in directions along the axes of the element body 11, the dimension in a direction along the first axis X may be equal to the dimension in a direction along the third axis Z and the dimension in a direction along the second axis Y may be larger than the dimension along the first axis X. In addition, for example, with respect to the dimensions in directions along the axes of the element body 11, the dimension in a direction along the second axis Y may be larger than the dimension in a direction along the third axis Z and the dimension in a direction along the third axis Z may be larger than the dimension along the first axis X. Furthermore, for example, the dimension in a direction along the second axis Y may be larger than the dimension in a direction along the first axis X and the dimension in a direction along the first axis X may be larger than the dimension in a direction along the third axis Z.

The material of the insulating portion 20 is not limited to the example given in the above embodiments and any material is acceptable as long as the material is an insulating material. For example, the material of the insulating portion 20 may be a magnetic insulating material. Furthermore, part of the insulating portion 20 may be a different insulating material from another part of the insulating portion 20.

The dimensions of the first coating electrode 71 are not limited to the examples given in the above embodiments. For example, the maximum height dimension of the first coating electrode 71 may be larger than the maximum height dimension of the first electrode 40. Furthermore, the maximum height dimension of the first coating electrode 71 may be larger than the height dimension of the first end surface 11C of the element body 11.

The first coating electrode 71 and the second coating electrode 72 may be omitted. When the first coating electrode 71 is provided by performing plating on the first electrode 40, the first coating electrode 71 may spread to the top surface 11F while the first coating electrode 71 is being formed. From the viewpoint of preventing such a situation from occurring, the first wiring layer height WH1 is preferably at least 5 μm smaller than the height dimension of the element body 11.

A value obtained by dividing the first wiring layer height WH1 by the first via layer height VH1 may be larger than 1 and less than 1.05 (i.e., from larger than 1 to less than 1.05) or may be larger than 1.95. Furthermore, the value obtained by dividing the first wiring layer height WH1 by the first via layer height VH1 is preferably from 1.10 to 1.90. The value obtained by dividing the first wiring layer height WH1 by the first via layer height VH1 is more preferably from 1.20 to 1.80.

Figure 7:
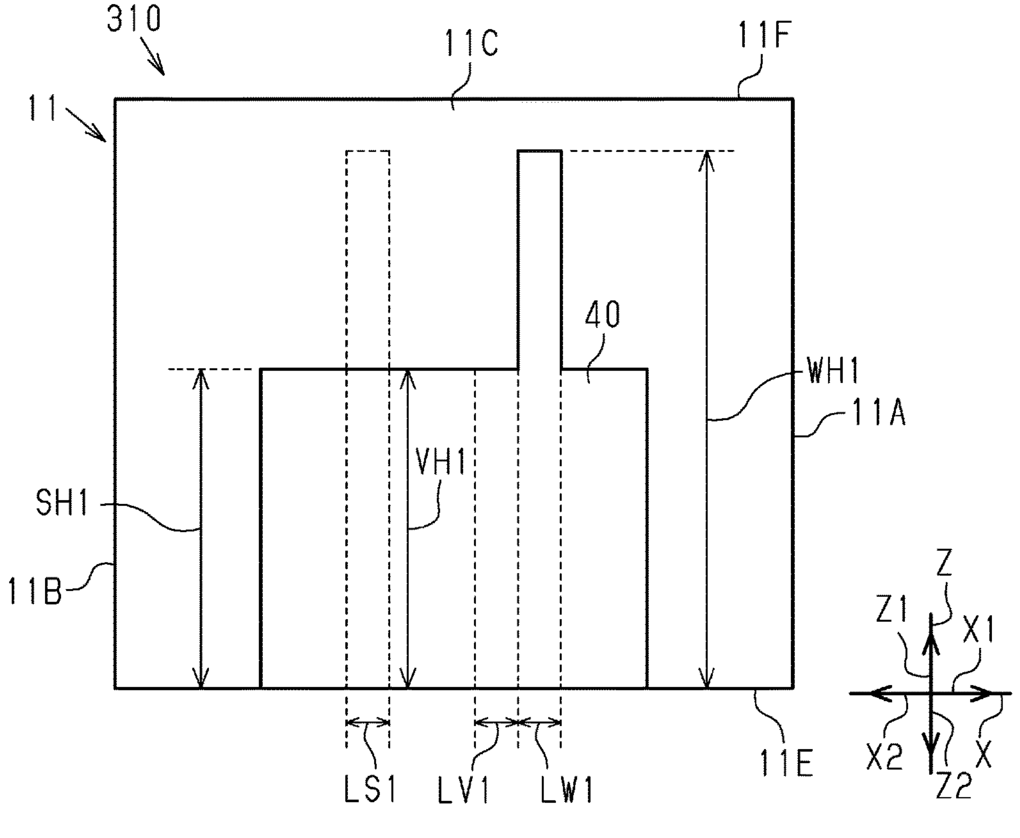
FIG. 7 is a diagram illustrating a first end surface of an element body of an inductor component of a Fourth Embodiment.

The Second Embodiment and the Third Embodiment may be combined with each other. In other words, in an inductor component 310 illustrated in FIG. 7, the height dimension of the first electrode 40 in parts other than the first wiring layer LW1 is a constant height that is smaller than the first wiring layer height WH1. In addition, in the inductor component 310 of this modification, the first wiring layer LW1 is located on the first negative direction X2 side when looking from the end of the first electrode 40 on the first positive direction X1 side.

Regarding the height dimension of the first electrode 40, so long as the first wiring layer height WH1 is larger than the first via layer height VH1, the height in other parts of the first electrode 40 can be changed as appropriate. For example, in the First Embodiment, the height dimension of the first electrode 40 in the fourth layer L4 containing the via 34 and the sixth layer L6 containing the via 36 may be smaller than the distance from the bottom surface 11E to each via.

Here, in the case where the inductor wiring 30 has a plurality of vias, the distance from the bottom surface 11E to the via closest to the bottom surface 11E, out of the plurality of vias, in a direction along the third axis Z is referred to as a shortest distance. Here, the height dimension of the first electrode 40 in parts other than the first wiring layer LW1 may be equal to the first via layer height VH1 at any location and the first via layer height VH1 may be smaller than the shortest distance. In these cases, the first electrode 40 does not overlap any of the vias when the inductor component 10 is viewed in the second negative direction Y2. Therefore, a stray capacitance generated between the first electrode 40 and each via can be reduced.

In the First Embodiment, the first symmetrical layer height SH1 does not have to be equal to the first wiring layer height WH1. If the first symmetrical layer height SH1 is larger than the first via layer height VH1, the area of the first electrode 40 exposed to outside the element body 11 on both sides of the first symmetry axis AX1 can be increased. In addition, the first symmetrical layer height SH1 may be less than or equal to the first via layer height VH1.

In the First Embodiment, the first symmetrical layer LS1 and the second wiring layer LW2 coincide with the ninth layer L9, but the second wiring layer LW2 does not have to coincide with the first symmetrical layer LS1. In other words, the second wiring layer LW2 may be a layer that is not located symmetrical to the first wiring layer LW1 with the first symmetry axis AX1 being an axis of symmetry.

The first via layer height VH1 may be greater than or equal to the distance from the bottom surface 11E to the via 32 in a direction along the third axis Z. In any case, it is sufficient that the first wiring layer height WH1 be larger than the first via layer height VH1.

The shape of via 32 is a cylindrical shape, but the shape is not limited to the example in the above embodiments. The cross-sectional shape of the via 32 does not have to be substantially circular, and may instead be substantially oval shaped, substantially fan shaped, substantially polygonal shaped, or a combination of these shapes. In addition, the term "columnar shape" used above includes not only shapes having a constant cross-sectional area and shape along the third axis Z, but also shapes having a variable cross-sectional area and shape along the third axis Z, such as a substantially conical trapezoidal shape.

In addition, an end of each wiring portion that functions as a pad, for example, the second end portion 31B of the first wiring portion 31 has a substantially circular pad shape, but is not limited to this shape. These end portions may be, for example, substantially circular, substantially oval shaped, substantially fan shaped, substantially polygonal shaped, or a combination of these shapes.

In each embodiment, the second electrode 50 has the same configuration as the first electrode 40, but the second electrode 50 is not limited to this configuration. For example, in the First Embodiment, the second symmetrical layer height SH2 of the second electrode 50 does not have to be equal to the second wiring layer height WH2. In other words, the first electrode 40 and the second electrode 50 do not have to have two-fold symmetrical shapes around the rotational center axis.

The number of wound turns of the inductor wiring 30 is smaller in the Second Embodiment than in the First Embodiment, but this does not have to be the case. For example, in the Second Embodiment, the number of wound turns of the inductor wiring 30 may be the same as in the First Embodiment and a dimension of the element body 11 in a direction along the first axis X may be larger than in the First Embodiment. Furthermore, even if the size of the element body 11 is the same, just the dimensions of the first electrode 40 may be larger.

What is claimed is:

1. An inductor component comprising:
 - a rectangular parallelepiped shaped element body having six outer surfaces; and
 - an inductor wiring that extends inside the element body, wherein
 - the element body has a first electrode connected to a first end of the inductor wiring and a second electrode connected to a second end of the inductor wiring,
 - when, among the six outer surfaces of the element body, a first surface is a main surface, a second surface that is perpendicular to the main surface is a first end surface, a third surface that is parallel to the first end surface is a second end surface, and a fourth surface that is perpendicular to both the main surface and the first end surface is a bottom surface,
 - the first electrode is exposed on the element body in a region from the first end surface to the bottom surface,
 - the second electrode is exposed on the element body in a region from the second end surface to the bottom surface, and
 - the inductor wiring includes:
   - a first wiring portion extending in a direction parallel to the main surface from the first end of the inductor wiring,
   - a via extending in a direction perpendicular to the main surface from the first wiring portion, the via having a first end and a second end, the first end of the via directly contacting the first wiring portion, and
   - an intermediate wiring portion directly contacting the second end of the via and extending outward from the second end of the via in the direction parallel to the main surface, and when, in the direction perpendicular to the main surface, a layer in which the first wiring portion exists is a first wiring layer, a layer in which the via exists is a via layer, a layer in which the intermediate wiring portion exists is an intermediate wiring layer, and a dimension in a direction perpendicular to the bottom surface is a height dimension, a maximum height dimension of the first electrode in the first wiring layer is larger than a maximum height dimension of the first electrode in the via layer and a maximum height dimension of the first electrode in the intermediate wiring layer.

2. The inductor component according to claim 1, wherein a value obtained by dividing the maximum height dimension of the first electrode in the first wiring layer by the maximum height dimension of the first electrode in the via layer is from 1.05 to 1.95.

3. The inductor component according to claim 2, wherein in a direction perpendicular to the main surface, an end of the first electrode on a main surface side is located closer to the main surface than the first wiring layer is located.

4. The inductor component according to claim 2, wherein when an axis that is perpendicular to the bottom surface and passes through a center of the first electrode in a direction perpendicular to the main surface is a symmetry axis and a layer that is located symmetrical to the first wiring layer across the symmetry axis is a symmetrical layer, the maximum height dimension of the first electrode in the symmetrical layer is larger than the maximum height dimension of the first electrode in the via layer.

5. The inductor component according to claim 2, wherein the maximum height dimension of the first electrode in a portion of the first electrode other than the first wiring layer is smaller than the maximum height dimension of the first electrode in the first wiring layer.

6. The inductor component according to claim 2, wherein the maximum height dimension of the first electrode in the via layer is smaller than a distance from the bottom surface to the via in a direction perpendicular to the bottom surface.

7. The inductor component according to claim 2, wherein when the via is a first via and the via layer is a first via layer, the inductor wiring includes a second wiring portion extending parallel to the main surface from the second end of the inductor wiring and a second via extending perpendicular to the main surface from the second wiring portion, and when, in the direction perpendicular to the main surface, a layer where the second wiring portion exists is a second wiring layer and a layer where the second via exists is a second via layer, a maximum height dimension of the second electrode in the second wiring layer is larger than a maximum height dimension of the second electrode in the second via layer.

8. The inductor component according to claim 2, wherein when the via is a first via first wiring layer, and the via layer is a first via layer, the inductor wiring includes a second wiring portion extending parallel to the main surface from the second end of the inductor wiring and a second via extending perpendicular to the main surface from the second wiring portion, and when, in the direction perpendicular to the main surface, a layer where the second wiring portion exists is a second wiring layer and a layer where the second via exists is a second via layer, the maximum height dimension of the first electrode in the second wiring layer is larger than the maximum height dimension of the first electrode in the first via layer.

9. The inductor component according to claim 2, wherein when an axis that is perpendicular to the bottom surface and passes through a center of the element body when viewing at the element body in a direction perpendicular to the bottom surface is a rotational center axis, the first electrode and the second electrode have two-fold symmetrical shapes around the rotational center axis.

10. The inductor component according to claim 2, further comprising:

a first coating electrode that covers the first electrode and is located outward from the outer surfaces of the element body; and a second coating electrode that covers the second electrode and is located outward from the outer surfaces of the element body, wherein a maximum height dimension of the first coating electrode at a position corresponding to the first wiring layer is larger than a maximum height dimension of the first coating electrode at a position corresponding to the via layer.

11. The inductor component according to claim 1, wherein in a direction perpendicular to the main surface, an end of the first electrode on a main surface side is located closer to the main surface than the first wiring layer is located.

12. The inductor component according to claim 1, wherein when an axis that is perpendicular to the bottom surface and passes through a center of the first electrode in a direction perpendicular to the main surface is a symmetry axis and a layer that is located symmetrical to the first wiring layer across the symmetry axis is a symmetrical layer, the maximum height dimension of the first electrode in the symmetrical layer is larger than the maximum height dimension of the first electrode in the via layer.

13. The inductor component according to claim 12, wherein the maximum height dimension of the first electrode in the symmetrical layer is equal to the maximum height dimension of the first electrode in the first wiring layer.

14. The inductor component according to claim 1, wherein the maximum height dimension of the first electrode in a portion of the first electrode other than the first wiring layer is smaller than the maximum height dimension of the first electrode in the first wiring layer.

15. The inductor component according to claim 1, wherein the maximum height dimension of the first electrode in the via layer is smaller than a distance from the bottom surface to the via in a direction perpendicular to the bottom surface.

16. The inductor component according to claim 1, wherein when the via is a first via, and the via layer is a first via layer, the inductor wiring includes a second wiring portion extending parallel to the main surface from the second end of the inductor wiring and a second via extending perpendicular to the main surface from the second wiring portion, and when, in the direction perpendicular to the main surface, a layer where the second wiring portion exists is a second wiring layer and a layer where the second via exists is a second via layer, a maximum height dimension of the second electrode in the second wiring layer is larger than a maximum height dimension of the second electrode in the second via layer.

17. The inductor component according to claim 1, wherein when the via is a first via and the via layer is a first via layer, the inductor wiring includes a second wiring portion extending parallel to the main surface from the second end of the inductor wiring and a second via extending perpendicular to the main surface from the second wiring portion, and when, in the direction perpendicular to the main surface, a layer where the second wiring portion exists is a second wiring layer and a layer where the second via exists is a second via layer, the maximum height dimension of the first electrode in the second wiring layer is larger than the maximum height dimension of the first electrode in the first via layer.

18. The inductor component according to claim 1, wherein when an axis that is perpendicular to the bottom surface and passes through a center of the element body when viewing at the element body in a direction perpendicular to the bottom surface is a rotational center axis, the first electrode and the second electrode have two-fold symmetrical shapes around the rotational center axis.

19. The inductor component according to claim 1, further comprising:

a first coating electrode that covers the first electrode and is located outward from the outer surfaces of the element body; and a second coating electrode that covers the second electrode and is located outward from the outer surfaces of the element body, wherein a maximum height dimension of the first coating electrode at a position corresponding to the first wiring layer is larger than a maximum height dimension of the first coating electrode at a position corresponding to the via layer.

20. The inductor component according to claim 19, wherein the maximum height dimension of the first coating electrode is smaller than the maximum height dimension of the first end surface.

* * * * *